Patented Dec. 21, 1948

2,457,074

UNITED STATES PATENT OFFICE 2,457,074

PROPENYL ETHACOL

Oliver J. Weinkauff, St. Louis, Mo., assignor to Monsanto Chemical Company, St. Louis, Mo., a corporation of Delaware No Drawing. Application June 6, 1945,
Serial No. 597,951

1 Claim. (Cl. 260—613)

This invention relates to the manufacture of 1-propenyl-2-hydroxy-3-ethoxy benzene and the intermediates used in the manufacture of this product.

The 1-propenyl-2-hydroxy-3-ethoxy benzene may also be called o-propenyl ethacol and it is used as a raw material for the manufacture of 2-hydroxy-3-ethoxy benzaldehyde which has many uses.

Briefly summarizing one embodiment of my invention, ethacol is reacted with allyl chloride to form the allyl ether of ethacol and the latter compound is rearranged to ortho-allyl ethacol, as illustrated by the following formulae:

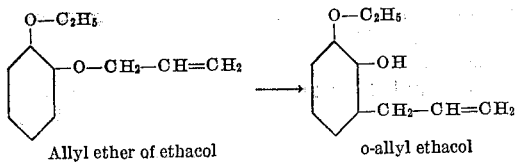

Allyl ether of ethacol    o-allyl ethacol

The ortho-allyl ethacol may be isomerized to ortho-propenyl ethacol and one of the objects of my invention is to effect this isomerization with high yields.

EXAMPLE I

*Preparation of the allyl ether of ethacol*

To a 2-liter flask equipped with a stirrer, thermometer well, reflux condenser and dropping funnel, there is charged 2.2 mols of ethacol, 2 mols of allyl chloride and approximately 400 cc. of methanol. In general, about 180 to 200 cc. of methanol or solvent are used for each mol of allyl chloride. The mixture is heated to refluxing with stirring and 2 mols of 50% sodium hydroxide are added from the dropping funnel within a period of 30 minutes. The heat of the reaction is sufficient to maintain the reaction mixture at refluxing conditions. The reaction mixture is then maintained at refluxing temperature for approximately 50 minutes after all of the sodium hydroxide has been added. After cooling to room temperature, the precipitated sodium chloride is removed by filtration. The filter cake is washed with methanol or solvent to recover the entrained allyl ether of ethacol. The filtrate, containing the alcohol and allyl ether of ethacol, is stripped of the alcohol by distillation. This distillation should be at temperatures below 120° C. and the solvent used should be chosen with this in mind. The residue or di-ether is then mixed with an equal volume of a hydrocarbon solvent, such as hexane or heptane, and then extracted with aqueous 5% sodium hydroxide to neutralize any excess acid. The extracted solution is then washed with water until free of alkali and fractionally distilled. The allyl ether of ethacol has a boiling point of 102° C. at 6 mm. pressure, 109° C. at 10 mm. pressure and 124° C. at 20 mm. pressure. The following tabulated data show the results obtained in two different tests:

|  | Test number | |
|---|---|---|
|  | A | B |
| Mol ethacol | 2.4 | 2.4. |
| Mol allyl chloride | 2.02 | 2.0. |
| Mol sodium hydroxide | 2.0 | 2.0. |
| Solvent | 400 cc. methanol | 400 cc. ethacol. |
| Ethacol recovered | 69.7 g | 79.5 g. |
| Allyl ether of ethacol | 278.5 g | 256.1 g. |
| Residue | 20.6 g | 43.1 g. |
| Percent yield based on ethacol | 82.6 | 79.1. |

In carrying out the above reaction, solvents other than methanol may be used to effect the reaction, for example, ethyl alcohol, and similar inert solvents. In the place of sodium hydroxide, other alkalies, such as potassium hydroxide and alkali metal carbonates, may be used.

EXAMPLE II

*Preparation of o-allyl ethacol*

The allyl ether of ethacol is rearranged to o-allyl ethacol by heating the di-ether at refluxing temperature for a short period of time, usually from 10 to 30 minutes is sufficient. In one example, 100 parts of the allyl ether of ethacol was refluxed at 240–250° C. for 15 minutes to effect the rearrangement. Temperatures above 220° C. are preferred for the step of effecting the rearrangement. The thus-treated product was then fractionated at 10 mm. pressure to recover the ortho-allyl ethacol. A conversion of 84.7% was obtained. If desired, small amounts of other materials may be added to the di-ether to assist with the rearrangement to ortho-allyl ethacol. Examples are small amounts (1% or less) of copper, iron, disodium phosphate, hydrochloric acid and the like. The increase in conversion obtained by these so-called catalysts is small and I prefer, therefore, to effect the rearrangement without the addition of other materials.

I have also determined that the presence of ethacol does not interfere with the rearrangement of the allyl ether of ethacol to ortho-allyl ethacol and, accordingly, this rearrangement may be effected with a fraction of the allyl ether of ethacol, as prepared in Example I, which also contains some ethacol.

The pure ortho-allyl ethacol has a crystallizing point of 20.9° C. and a boiling point of 108° C. at 5 mm. pressure, 118° C. at 8 mm., 122° C. at 10 mm. and 134° C. at 30 mm. pressure.

EXAMPLE III

Preparation of ortho-propenyl ethacol

The isomerization of ortho-allyl ethacol to orthopropenyl ethacol, as illustrated by the following formulae:

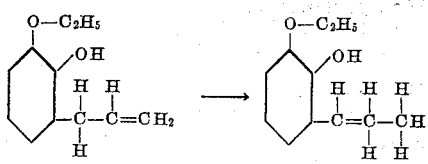

may be effected in good yields in an aqueous medium in the presence of excess potassium hydroxide if heated under carefully controlled conditions. The amount of potassium hydroxide used must be more than that required to form the potassium phenate of the ortho-allyl ethacol used in the reaction and in general the excess KOH should exceed at least two mols.

A mixture of 670 parts of 85% potassium hydroxide and 500 parts of water are heated to approximately 120° C. in a reactor equipped with a thermometer well, stirrer, reflux condenser and an inlet for a dropping funnel or intermittent feeder. 500 parts of ortho-allyl ethacol is added over a period of 15 minutes and it is preferred to maintain the temperature of the potassium hydroxide solution at approximately 120° C. during this addition. After the addition of the ortho-allyl ethacol, the temperature of the reaction mixture is raised to 130° C. and maintained at this temperature for approximately 4 hours. At the beginning of the addition of the allyl ethacol, a solid salt separates. Near the end of the addition, this material or solid turns liquid and the reaction mixture consists of 2 liquid phases for about the first hour—one being the aqueous phase and the other the phenate phase. The phenate phase then gradually solidifies and at the end of the reaction, the reaction mixture consists of an aqueous alkali layer and a solid phenate layer.

After the heating period, the reaction mixture is cooled to about room temperature and the solid removed by filtration. The solid potassium salt of the ortho-propenyl ethacol is dissolved in water, preferably at temperatures between 50–60° C., and the resulting solution acidified with HCl or some suitable mineral acid. The oily layer which separates is washed at 50–60° C. with warm water, separated and dissolved in a suitable solvent, such as heptane. On cooling this hydrocarbon solution, containing the ortho-propenyl ethacol, to 5–10° C., the ortho-propenyl ethacol separates as a solid. This is removed by filtration, washed with additional cold heptane and dried. The petroleum solvent is removed from the filtrate by distillation and the resulting oil is retreated in the same manner as indicated above; that is, the same ratios of material to be rearranged, potassium hydroxide and water, are used. By effecting this isomerization at a temperature of 130° C., as indicated above, at least 70% of the ortho-allyl ethacol was isomerized to transortho-propenyl ethacol, which has a melting point of 67.2° to 67.8° C. Similar conversions may be obtained by heating within the range of 125–140° C. and the preferred range is from 127° to 133° C. For the purpose of my invention, temperatures above 140° C. should be avoided. The higher temperatures give low yields and a product which is difficult to refine.

The 1-propenyl-2-hydroxy-3-ethoxy benzene (ortho-propenyl ethacol) may be used as a starting material for the preparation of other important compounds, such as 2-hydroxy-3-ethoxy benzaldehyde. This oxidation of the propenyl ethacol to the aldehyde may be effected by several methods, but one of the preferred methods is by the oxidation with nitrobenzene in the presence of potassium hydroxide at temperatures of the order of 120° C.

I claim:
1-propenyl-2-hydroxy-3-ethoxy benzene.

OLIVER J. WEINKAUFF.

REFERENCES CITED

The following references are of record in the file of this patent:

UNITED STATES PATENTS

| Number | Name | Date |
| --- | --- | --- |
| 1,704,494 | Boedecker | Mar. 5, 1929 |

OTHER REFERENCES

Claison, "Annalen," vol. 401, pages 50, 52.
Fletcher et al., "Jour. Am. Chem. Soc.," vol. 65 (1943) pages 1431–1432.